United States Patent
Lingle et al.

[19]

[11] Patent Number: 6,139,938
[45] Date of Patent: Oct. 31, 2000

[54] HIGH FLUTE DENSITY, PRINTABLE, CORRUGATED PAPERBOARD

[75] Inventors: John E. Lingle, Brookfield; Terry S. Paulson, Waukesha; David B. Stucker, Hartford, all of Wis.

[73] Assignee: Innovative Packaging Corp., Milwaukee, Wis.

[21] Appl. No.: 09/255,257

[22] Filed: Feb. 22, 1999

[51] Int. Cl.[7] .................................. B32B 3/28; B31F 1/20
[52] U.S. Cl. .................... 428/182; 428/213; 156/205; 156/210
[58] Field of Search .................... 428/182, 184, 428/212, 213; 156/205, 210, 290, 292

[56] References Cited

U.S. PATENT DOCUMENTS

| | | | |
|---|---|---|---|
| 2,517,069 | 8/1950 | Weymouth | 154/106 |
| 3,607,598 | 9/1971 | LeBlanc et al. | 161/133 |
| 3,972,763 | 8/1976 | Wolvin et al. | 156/210 |
| 4,262,050 | 4/1981 | Jenkins | 428/138 |
| 4,409,274 | 10/1983 | Chaplin et al. | 428/112 |
| 4,461,665 | 7/1984 | Schertler | 156/210 |
| 4,544,597 | 10/1985 | Peer, Jr. et al. | 428/182 |
| 4,673,608 | 6/1987 | Cline | 428/182 |
| 4,710,417 | 12/1987 | Cline | 428/182 |
| 4,726,863 | 2/1988 | Cline | 156/210 |
| 4,886,563 | 12/1989 | Bennett et al. | 156/205 |
| 4,906,510 | 3/1990 | Todor, Jr. et al. | 428/182 |
| 4,931,346 | 6/1990 | Nogueras Dardiña | 428/182 |
| 4,950,524 | 8/1990 | Hacker | 428/163 |
| 5,290,622 | 3/1994 | Tanabe | 428/182 |
| 5,496,617 | 3/1996 | Bullock, Sr. | 428/182 |
| 5,670,238 | 9/1997 | Earl et al. | 428/182 |

*Primary Examiner*—Donald Loney
*Attorney, Agent, or Firm*—Boyle Frederickson Ziolkowski S.C.; James F. Boyle

[57] ABSTRACT

An extremely thin, high flute density, printable, corrugated paperboard having a combined caliper thickness of about 0.040 inches or less includes a first flat paper liner about 0.0085 to 0.010 inches thick, a corrugated medium having a paper thickness of about 0.005 to 0.008 inches, with the flute dimensions including a cordal flute height of about 0.021 inches and a distance between flute crests of about 0.070 inches, and a second flat paper liner about 0.0065 to 0.01 inches thick, the composite paperboard product having about 181 flutes per linear foot. The process for manufacturing the corrugated paperboard includes novel steps for forming the flutes in a manner which will not cause wrinkling or tearing of the paper stock, and the application of a novel adhesive formulation having solid content of about 28.8 percent and a Steinhall viscosity of about 23 seconds.

16 Claims, 9 Drawing Sheets

HIGH FLUTE DENSITY, PRINTABLE, CORRUGATED PAPERBOARD

BACKGROUND OF THE INVENTION

1. Field of the Invention

The present invention relates to the manufacture of an extremely thin, high flute density, corrugated paperboard. In particular, the invention disclosed herein relates to a corrugated paperboard suitable for use on high resolution offset lithographic printing operations, and to a method of manufacturing such a product.

2. Background of the Related Art

Corrugated paperboard, commonly referred to as cardboard, is in its most basic form structurally comprised of three layers of sheet paper stock in which a middle corrugated layer of paper is sandwiched between two flat paper liners. The middle layer of paper is corrugated by forming in it a regular pattern of alternating ridges and grooves. The ridges and grooves, commonly referred to in the industry as flutes, are then glued to the interior surfaces of the two flat paper liners. In comparison to solid board of the same thickness, a corrugated paperboard uses much less material and therefore is typically much less costly, and corrugated paperboard is usually much stronger structurally.

Corrugated paperboard has long been known and has many uses. It is widely used in making containers, i.e., boxes, for packaging and shipping a wide variety of goods. However, corrugated paperboard also has its limitations. For instance, corrugated paperboard is usually not well suited for use in high quality graphics printing operations. With respect to the outer surface of the liner on a corrugated paperboard, the area between adjacent flutes is unsupported and therefore too flimsy to print on. It is simply impossible to precisely align the different colored dots of ink on a multi-color press. The ink dots run together, resulting in a blurred image. Current grades of corrugated paperboard are also too thick to run on standard offset printing presses. Most printing presses require a printing stock having an approximate caliper thickness of 0.040 inches or less. One of the thinnest known grades of corrugated paperboard is a light weight laminated paperboard produced by Book Cover Inc. (see U.S. Pat. No. 4,931,346). That product in its thinnest grade is 0.060 inches, or 1.5 mm, which is 50% too thick for use as printing stock in offset presses.

Corrugated paperboard is ordinarily produced on large paper web processing machines on which large rolls of raw paper stock are unwound and processed continuously to produce the product. Depending on the grade of product being made and the efficiency of the operation, corrugated paperboard is preferably produced at speeds ranging between 300 and 800 linear feet per minute. However, conventional corrugating operations are simply incapable of producing a corrugated paperboard suitable for use in offset lithographic printing operations. There are many reasons for this, most of which may be generally categorized as either a physical limitation of the paper stock used in corrugating operations, or in a limitation in the process of gluing the multiple layers of paper together to form the corrugated paperboard.

To manufacture a very thin corrugated paperboard, a very thin, flexible paper stock must be used, particularly for the middle layer. However, paper stock which is too thin and too flimsy will become wrinkled and ripped on most conventional corrugators. The adhesive compounds used on most conventional corrugating operations typically use a low solid content and high moisture content formulation. In the manufacture of corrugated paperboard, the product is subjected to a high degree of heat and pressure in order to evaporate the moisture and thus dry the glue. In larger grades of corrugated paperboard, the moisture is exhausted through the flutes out through the side edges of the product. To manufacture a corrugated paperboard with an approximate caliper thickness of less than 0.040 inches, which would be required to make it usable in offset printing presses, the flutes are simply too small to function as exhaust channels for evaporating the moisture in the glue. As a result, the moisture in the adhesive formulation flashes thereby causing the bonds between the various layers of paper to break apart and separate. Because of these and other process limitations, conventional corrugating operations are simply incapable of producing grades of corrugated paperboard suitable for use in offset printing operations.

SUMMARY OF THE INVENTION

An extremely thin, high flute density, corrugated paperboard suitable for use in high resolution offset lithographic printing presses, and a method for manufacturing such a product is disclosed.

The method of manufacturing extremely thin, high flute density, corrugated paperboard of the present invention includes the step of selecting appropriate grades of paper stock having a relatively high degree of porosity which allows moisture for the gluing operations to evaporate and migrate through the paper stock, as opposed to exhausting the moisture out through the flutes as occurs in a conventional corrugating operation, and the step of formulating a novel adhesive compound having an unusually high solid content and low viscosity in comparison to conventional adhesive formulations that have been traditionally used in corrugating operations.

The manufacturing method also includes several novel steps for processing the paper stock in a manner which will prevent wrinkling and tearing, and steps for applying and curing of the adhesive formulation in a manner which will facilitate and preserve the adhesive bonding of the various layers of paper stock. The manufacturing process disclosed herein produces a corrugated paperboard having a combined board thickness of less than 0.040 inches, which is suitable for use on high resolution graphics printing presses. The extremely thin corrugated paperboard disclosed herein is comprised of a corrugated medium having approximately 550 flutes per linear meter (about 181 flutes per linear foot), which means that flutes are spaced together closely enough (about 1.80 mm) to provide support to the exterior surface of the liner sufficient for printing. The corrugated paperboard disclosed herein is thus well suited for use in constructing containers for packaging and shipping goods sold in a retail environment, such containers normally requiring very high quality graphics.

Other objects and advantages of the invention will become apparent from the following description which sets forth, by way of illustration and example, certain preferred embodiments of the present invention.

BRIEF DESCRIPTION OF THE DRAWINGS

The drawings, which constitute a part of the specification and illustrate an exemplary embodiment of the present invention, include the following.

DETAILED DESCRIPTION OF THE PREFERRED EMBODIMENT

Figure 1:
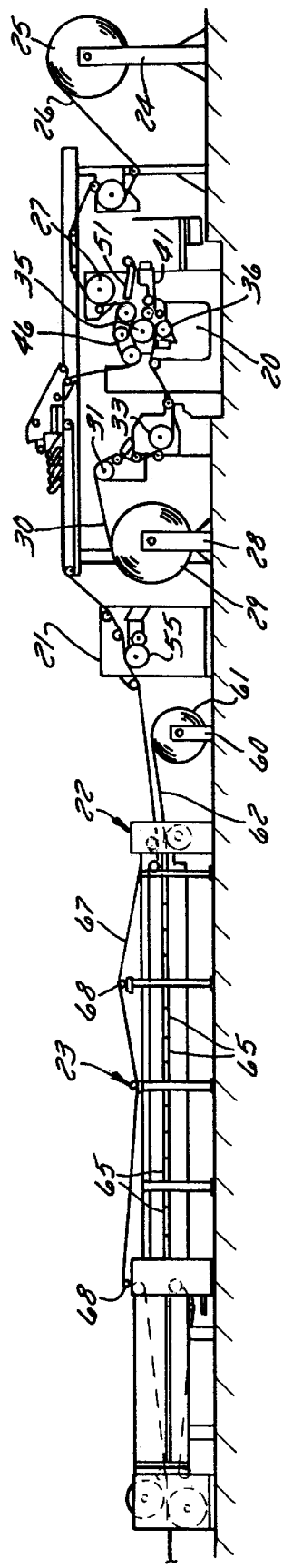
FIG. 1 is a side plan view of a corrugating processing line for manufacturing an extremely thin, high flute density, corrugated paperboard of the present invention.
Figure 3:
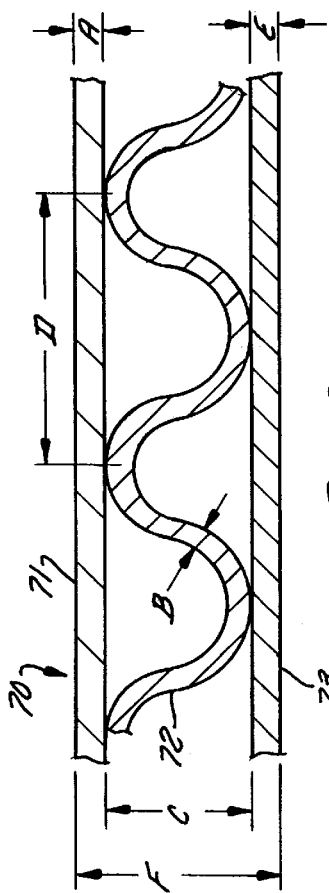
FIG. 3 is a partial cross sectional view of the corrugated paperboard of the present invention.
Figure 2:
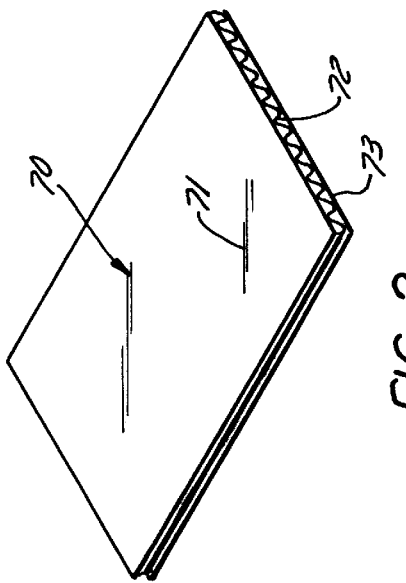
FIG. 2 is a partial perspective view of the corrugated paperboard of the present invention.

Referring to the figures, FIGS. 1 and 4–15 illustrate the essential equipment and process steps for fabricating a very thin, high flute density, corrugated paperboard of the present invention, and FIGS. 2 and 3 illustrate the resulting product. Corrugated paperboard may be generally described as a corrugated middle layer of paper sandwiched between a first flat paper liner and a second flat paper liner. The general steps for manufacturing corrugated paperboard may be broadly described as follows: selecting and unwinding a first roll of paper stock for use as a first liner; selecting and unwinding a second roll of paper stock for use as a middle layer, the middle layer being alternatively referred to as the medium; corrugating the middle layer of paper to form a fluted medium, the flutes being defined by a regular pattern of alternating ridges and grooves; gluing the crests of the ridges on one side of the medium to the surface of the first liner; selecting and unwinding a third layer of paper roll stock for use as a second liner; and, gluing the bottom of the grooves on the other side of the fluted medium to the surface of the second liner.

The process of manufacturing corrugated paperboard begins first with the selection of the paper stock and formulation of the adhesive used to fabricate the product. The first roll of paper stock used for the first layer, which is often referred to in the industry as the single face liner, is preferably made from pulp fibers having relatively short fiber lengths, which provides a relatively high degree of porosity, moisture absorption and evaporation characteristics. Water absorption and porosity, as based on a standardized lactic acid drop test, should not exceed 450 seconds. Currently, such grades of high porosity paper are normally made from one hundred percent recycled pulp fibers. For the manufacturing method and the corrugated paperboard disclosed herein, the first layer preferably consists of a grade referred to in the trade as "33-lb." paper, meaning that the paper has a weight of about 33 lbs. per 1000 sq. ft. (MSF), and consequently has an approximate caliper thickness of about 0.0085 to 0.010 inches. One particular grade of roll stock paper acceptable for use as the first layer in the present invention is a two-ply kraft liner available from Liberty Paper Company, and has the following specifications.

| First Layer 2-Ply Kraft Liner | | |
|---|---|---|
| Conditioned Wt. | Target | 33.0 |
| (on mach. gauge | Max. | — |
| (#/1000 sq. ft.) | Min. | 32.3 |
| CD 2 Sigma | Target | — |
| Weight Spread | Max. | 1.3 |
| (Roll Based) | Min. | — |
| Mullein | Target | 80 |
| T-807 om 87 | Max. | — |
|  | Min. | 71 |
| M.D. Scuff (Finished) | Target | 20 |
| UM-580 | Max. | — |
|  | Min. | 10 |
| Cobb Size | Target | — |
| T-441 om 90 | Max. | 155 |
| 30 Min. Test | Min. | — |
| Lactic Acid | Target | 400 |
| (Finished and Unfinished) | Max. | — |
| UM-596 | Min. | 200 |
| Slide Angle | Target | 25 |
| (Finished) | Max. | — |
| T-503 om 89 | Min. | — |
| Peel | Target | 1.0 |
| (TMD and OTMD) | Max. | — |
| UM-808 | Min. | 0.80 |
| CD Ring Crush | Target | — |
| (Roll Based) | Max. | — |
| T-822 om 89 | Min. | 50 |
| Smoothness | Target | 350 |
| T-538 om 88 | Max. | — |
|  | Min. | — |
| Moisture Roll Average | Target | 6.3 |
| (on mach. gauge %) | Max. | 9.0 |
|  | Min. | 4.5 |
| Max. Spreads | CD 2 σ Max. | 2.5 |
|  | Total 2 σ Max. | 4.0 |
|  | Avg. + Total 2 σ Max. | 12.0 |

The middle corrugated layer, also referred to as the medium, is also preferably a paper stock made from recycled pulp fibers having relatively short fiber lengths, which again provides a high degree of porosity, moisture absorption and evaporative characteristics. Likewise, the water absorption and porosity of the middle layer should not exceed 450 seconds based on the lactic acid drop test. The medium is preferably a 20-lb. MSF grade having an approximate caliper thickness of about 0.005 to 0.008 inches. One particular grade of 20-lb. paper which may be utilized in the manufacturing process disclosed herein is available from Thunder Bay Packaging Inc. and has the following specifications:

| 20# Medium | |
|---|---|
| Basis Weight (g/m$^2$) | 98.0 |
| Basis Weight (lbs/MSF) - TAPPI T410 | 20.0 |
| Caliper (Microns) | 178 |
| Caliper (0.001") - TAPPI T411 | 7.0 |
| Moisture (%) - TAPPI T550 | 70 |
| Concora (lbs force) - TAPPI T809 | 40 |
| Concora (N) | 180 |
| Ring Crush - CD (lbs force/6") TAPPI T822 | 24 |
| Ring Crush - CD (N/meter) | 700 |
| Water Drop (secs) TAPPPI T835 | 40 |
| Porosity (secs/100 ml) TAPPI T460 | 40 |

The third layer of paper stock used for the second liner, which is often referred to in the industry as the double face liner, is preferably a grade of paper highly suited for use in printing operations. For high quality graphics printing, a clay-coated paper stock is preferred. Because moisture evaporates and migrates during the manufacturing process through the porous first and second layers, it is not necessary for the third layer to also have that characteristic. Therefore, clay coat printing grade papers are acceptable, and in fact preferred. One particular grade of printable paper stock acceptable for use in the manufacturing process discussed below is known as *Kemiart lite,* available from Kemiart US Inc. Specifically, it is a clay-coated 41-lb. MSF paper having an approximate caliper thickness of 0.0095 to 0.0010 inches, and having the following specifications:

| Double Face Liner | | | |
|---|---|---|---|
| Mullen | psi | SCAN-P25 | 138 |
| SCT cd (STFI) | lbf/6 in | SCAN-P46 | 23 |
| Ply Bond | ft. lbs/1000 in$^2$ | TAPPI UM 403 | 120 |
| Moisture | % | SCAN-P4 | 6 |
| PPS 10 Smoothness | μm | ISO 8791-4 | 4,3 |
| GE Brightness | % | SCAN-P3 | 78 |
| Gloss | % | TAPPI T 480 | 34 |
| Cobb 60 s surface | g/m$^2$ | SCAN-P12 | 28 |
| Friction Angle | ° | TAPPI 815 | 25 |
| Caliper | point | SCAN-P7 | 8,5 |

Depending on the particular purpose that the paperboard will be used for and the nature of the printing operation that it will be used on, alternative grades of either a bleached or snow-top paper may be used for the third layer, provided that the grades are about 31 to 41 lbs. MSF and have an approximate caliper thickness within the range of about 0.0065 to 0.0012 inches.

The present invention also utilizes an adhesive formulation having a relatively high solid content and relatively low viscosity, especially in comparison to adhesive formulations used on most conventional corrugation operations. Solid content is the measurement by volume of the percent of solid particles in the formulation. In the manufacturing process disclosed herein, the adhesive formulation preferably has a solid content of about 28 to 30%, with a preferred target of about 28.8% solids. The relative viscosity of adhesives used in the manufacture of corrugated paperboard is indicated by the number of seconds required for 100 cc's of adhesive mix to pass through a standardized orifice. One type of viscosity measurement instrument commonly used throughout the industry is known as a "Viscosity Cup," or "Steinhall Cup." The Steinhall viscosity of the adhesive formulation disclosed herein is preferably in the range of about 20 to 25 seconds, with a preferred target of about 23 seconds. One particular acceptable adhesive formulation, available from Chemron Corporation, is formulated as follows:

| PRIMARY MIXER | |
|---|---|
| Water lbs. | 550 |
| Heat ° F. | 125 |
| Pearl Starch lbs. | 0 |
| Chemron lbs. | 125 |
| Caustic lbs. | 25.7 |
| Caustic Mix Time | 120 |
| Carrier Heat ° F. | 90 |
| Primary Borox lbs. | 1.5 |
| Caustic Mix Time secs. | 240 |

| -continued | |
|---|---|
| SECONDARY MIXER | |
| Water lbs. | 1125 |
| Mix Time secs. | 30 |
| Final Heat ° F. | 102 |
| Pearl Starch lbs. | 560 |
| Pearl Starch Mix Time secs. | 30 |
| Borox lbs. | 5.7 |
| Liquid lbs. | 0 |
| Resin lbs. | 0 |
| Shear Mix Time secs. | 250 |
| BATCH DATA RANGES | |
| Viscosity Steinhall secs. | 20–25 sec.; Target 23 secs. |
| Gel pt. % ° F. | 134–138; Target 136 |
| Solids % | 28.0–30.0%; Target 28.8% |
| Viscosity Storage Tank | 20–25 secs.; Target 23 secs. |
| % Moisture | 70.0%–72.0%; Target 71.2% |

Referring to FIG. 1, the essential equipment requirements for producing corrugated paperboard include a corrugation station 20 for fabricating what is often referred to as a single face corrugation, a gluing station 21 for gluing the exposed flute tips on the opposite side of the single face corrugation; a double facer bonding station 22 for bonding the second liner to the glued flute tips of the single face corrugation to thereby form the double faced corrugated paperboard product, and a heating station 23 for heating and drying the product.

Figure 4:
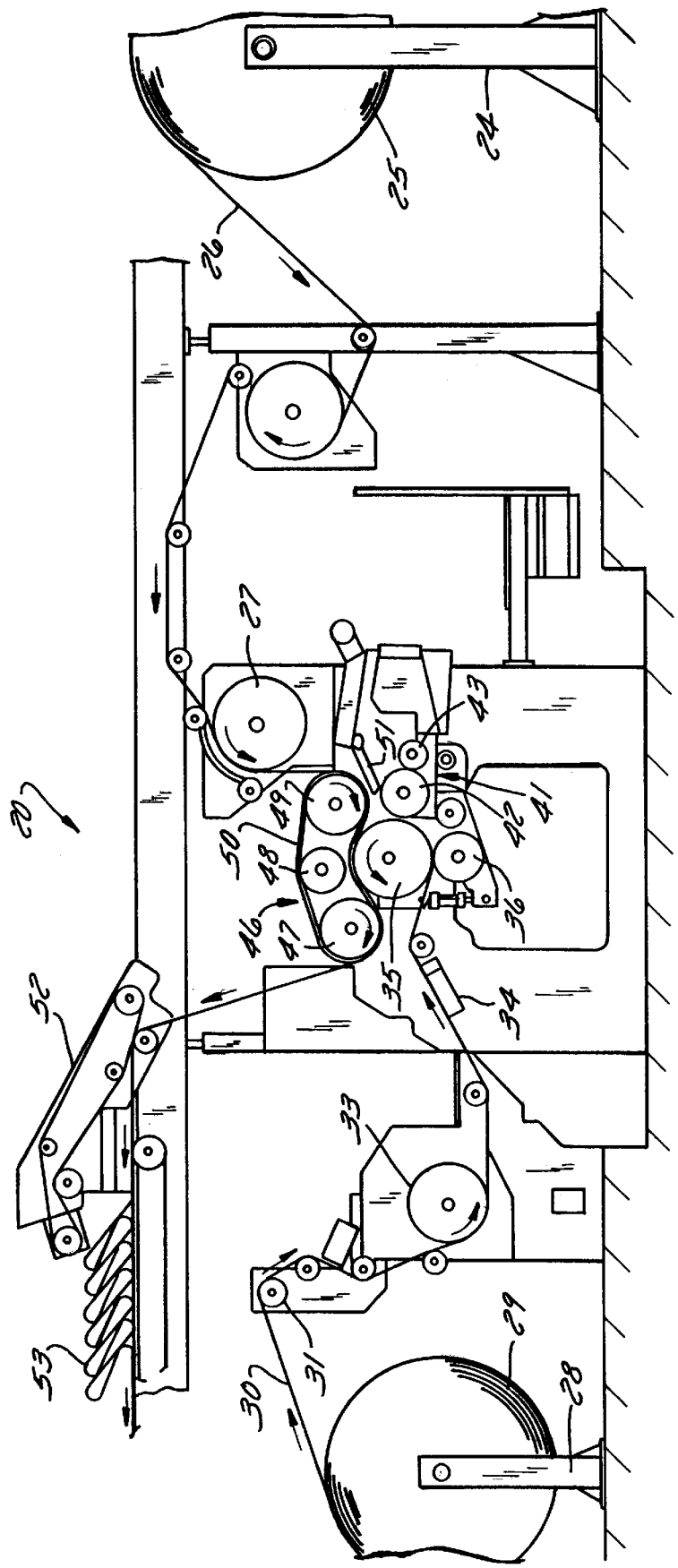
FIG. 4 is a side plan view of the corrugation station.
Figure 5:
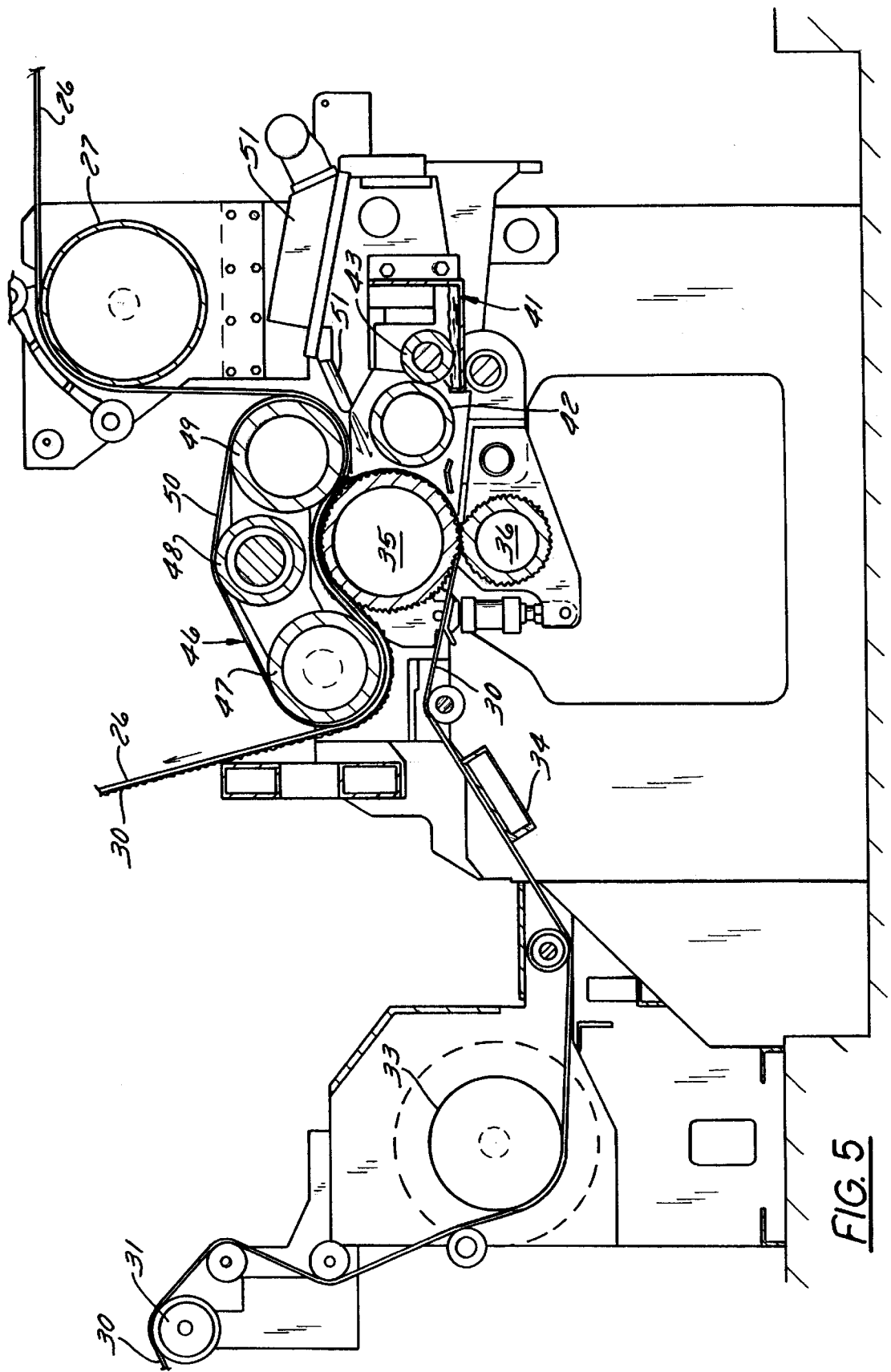
FIG. 5 is a cross section view of the corrugation station.

Referring to FIGS. 4 and 5, the corrugation station for fabricating the single face corrugated paperboard includes a first paper unwinder 24 for unwinding a first roll 25 of paper stock for use as the first liner 26. The first layer of paper stock is preheated by passing it over a heating roll 27 to bond it with the corrugated medium. Because the first liner is comprised of a relatively thicker and stiffer grade of paper stock, at least thicker and stiffer in comparison to the medium layer, no other particular special treatment of the first layer is required.

Figure 6:
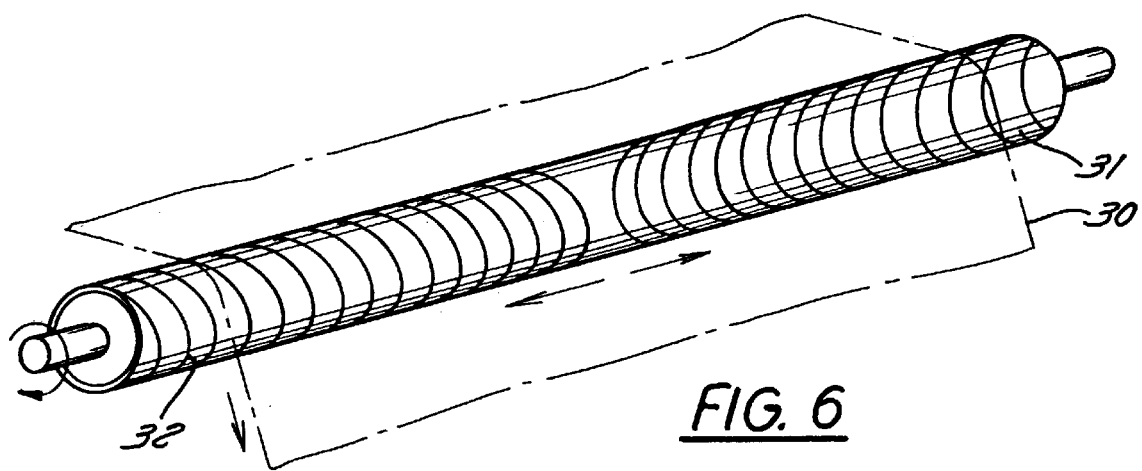
FIG. 6 is a perspective view of the spreader roll.
Figure 7:
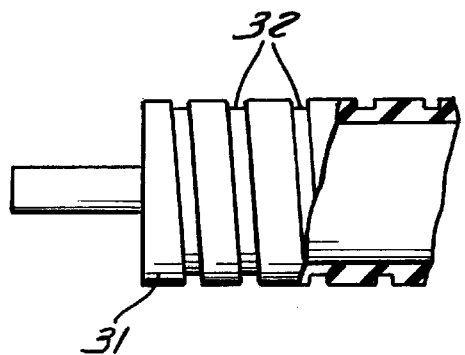
FIG. 7 is a partial cross section view of the spreader roll.

The corrugation station also includes a second paper unwinder 28 for unwinding a second roll 29 of paper stock for use as the medium 30. As mentioned, because the medium is comprised of a very light weight, very thin, and thus extremely malleable grade of paper, it must be preconditioned by spreading it out from side to side so that it is perfectly flat when it enters the corrugator, and also by heating it. The means for spreading the paper comprises a spreader roll 31 which removes any wrinkles that otherwise might form in the paper. Referring to FIGS. 6 and 7 the spreader roll 31 preferably consists of a rubber-coated roll approximately 7 inches in diameter, and has on its outer surface a series of spiral ridges or grooves 32. The rubber coating preferably has a durometer hardness of about 80 to 90. The grooves 32 are spaced about one-quarter inch apart from each other. The grooves start in the center of the roll and spiral outwardly toward the end of the rolls. Consequently, as the paper stock for the medium 30 passes over the spreader roll 31, the spreader roll 31 spreads the paper out side to side to make it extremely smooth and flat. The spreader roll 31 is of course positioned between the second paper unwinder and the corrugated rolls. The heating roll 33 for the medium is a conventional heating roll. After heating, the medium is steamed with a steam shower 34 to ease formation of the flutes.

Figure 8:
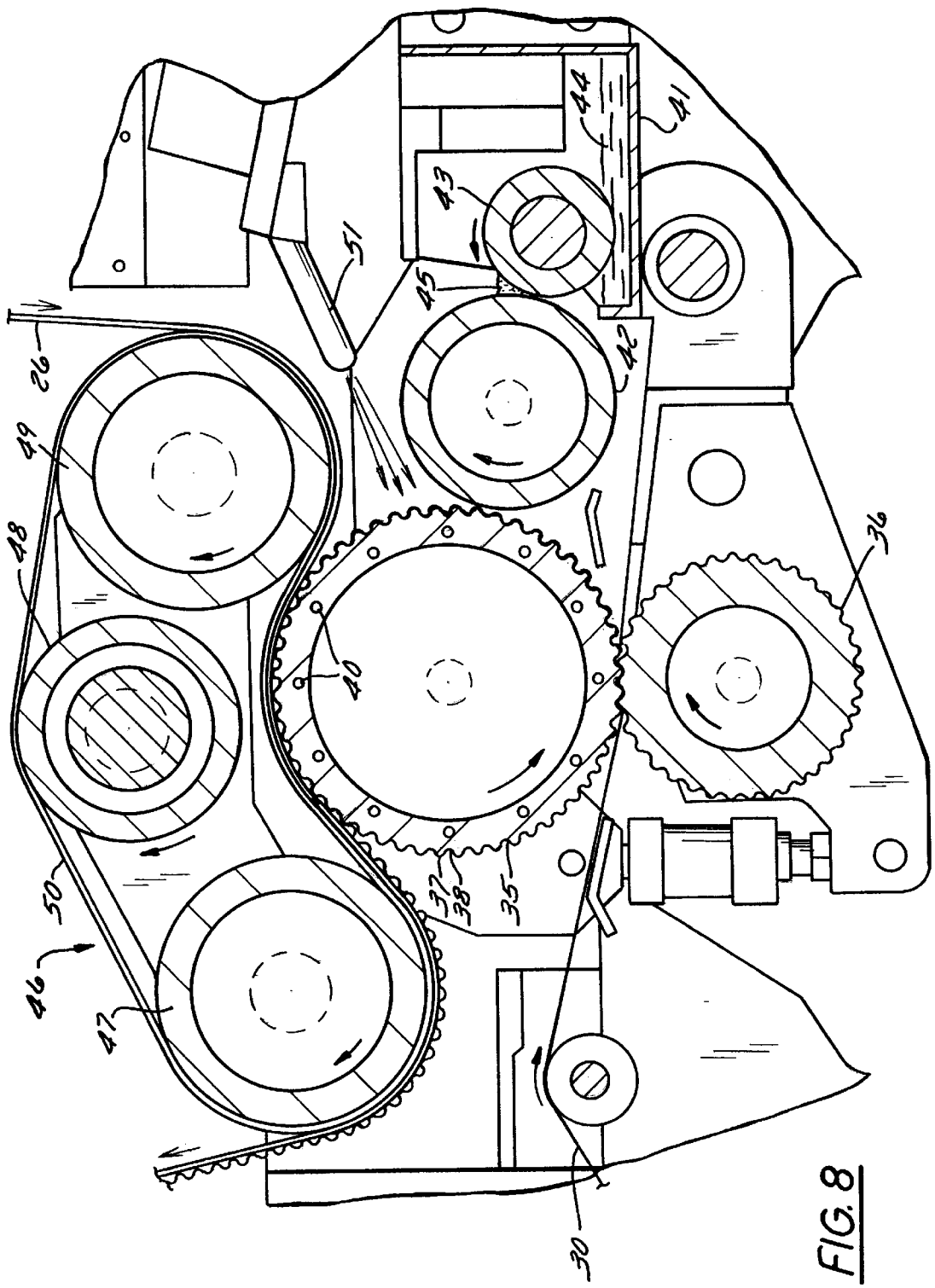
FIG. 8 is a cross section view of the corrugator rolls, belt module and glue unit in the corrugating station.
Figure 9:
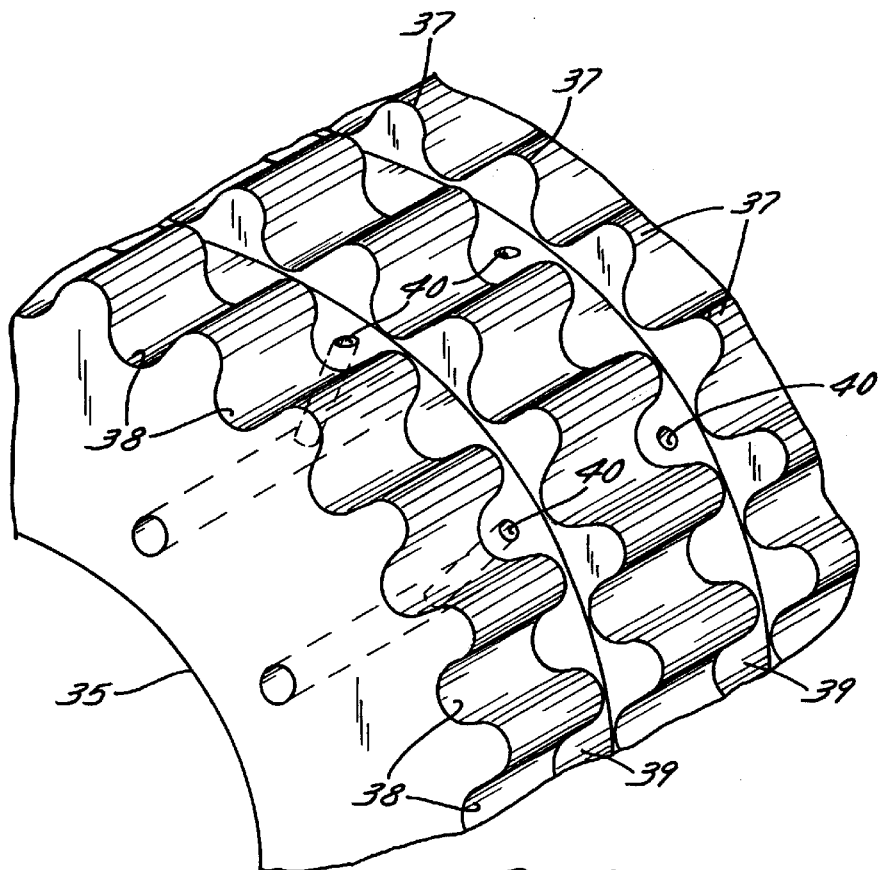
FIG. 9 is a partial perspective view of the surface of the corrugating roll.
Figure 10:
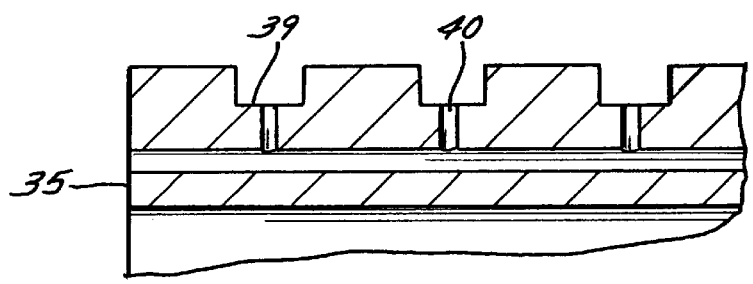
FIG. 10 is a partial cross section view of the corrugator roll.
Figure 11:
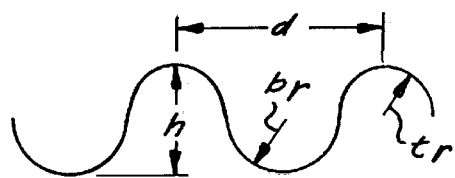
FIG. 11 is a schematic illustration of the flute dimensions in the corrugator roll.
Figure 12:
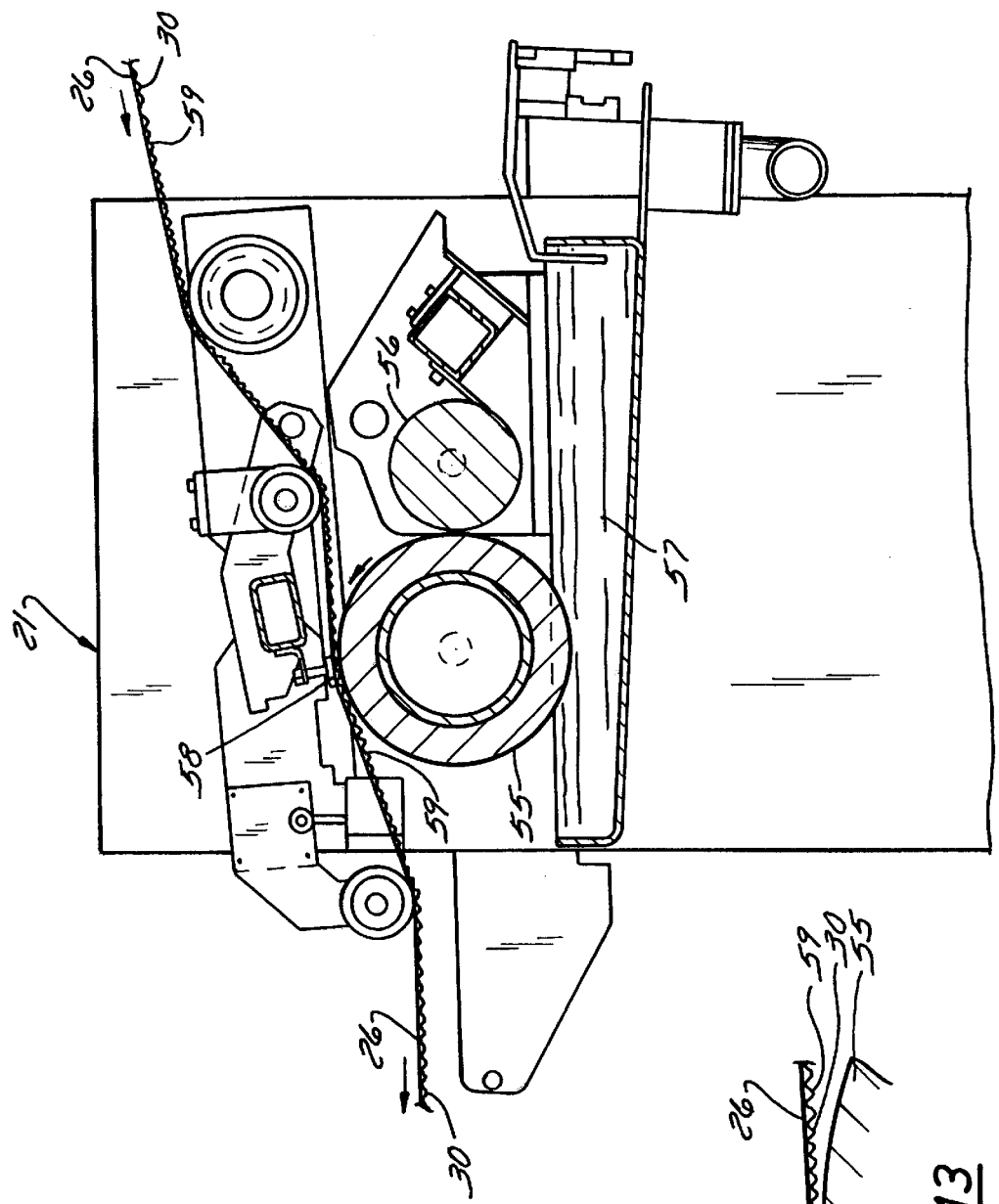
FIG. 12 is a cross section view of the gluing station for gluing the exposed flute tips of the single face corrugated material in preparation for applying the double face liner.
Figure 13:
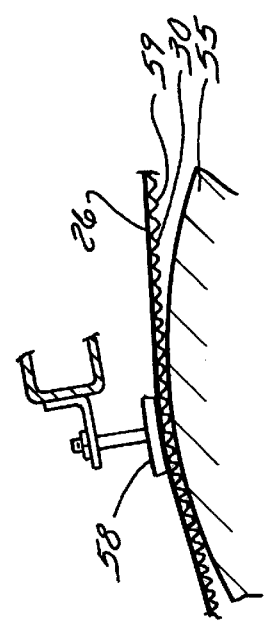
FIG. 13 is a partial sectional view of the pressure bar and glue roll of the gluing station for the double face liner.

Referring to FIGS. 8–11, the corrugator rolls are comprised of a first corrugator roll 35 and second corrugator roll 36 located adjacent and parallel to each other. The first and second corrugator rolls have on their outer diameters a complementary set of ridges 37 and grooves 38 for forming the flutes in the corrugated medium layer. The flutes are formed in the medium by passing the medium through the nip point formed by the two corrugator rolls as illustrated in FIG. 8. With reference to the schematic illustration in FIG. 11, the flutes for the first corrugator roll have a tooth height h of preferably about 0.55 mm (about 0.022 inches); the distance d between the flutes (i.e., the distance between the tips of the teeth) is preferably about 1.80 mm (about 0.071 inches); the tooth top radius tr is preferably about 0.35 mm (about 0.014 inches); and the tooth bottom radius br is preferably about 0.60 mm (about 0.024 inches). The exterior tooth dimensions on the second corrugation roll 36 correspond to the dimensions on the first corrugation roll 35 so that the two rolls work cooperatively with each other to form the flutes in the corrugated medium. The corrugating rolls produce a corrugated medium having about 555 flutes per linear meter (about 181 flutes per linear foot). Of course, the dimensions stated above may be adjusted to a slight amount provided that the resulting product has about 500 to 600 flutes per meter (about 170 to 190 flutes per foot).

The corrugator rolls further include steam channels for heating the rolls, and thus heating the paper during the corrugation process. Additionally, the first corrugator roll 35 includes a series of circumferential slots 39 approximately one-eighth-of-an-inch wide and one-inch apart. In each slot is a series of holes, or recesses 40, which extend inwardly from the surface of the roll. The slots 39 and recesses 40 work cooperatively with an air pressure regulator, discussed further below, to maintain the medium layer in contact with the corrugation roll as it passes through the corrugator, and to release it from the surface of the roll after it has been bonded to the single face liner.

The corrugation station 20 further includes a glue unit 41 located adjacent to the corrugator rolls. The glue unit 41 includes a glue roll 42, metering roll 43, and a pooling area 44 for the adhesive. The glue roll 42 is located adjacent and parallel to the first corrugator roll 35, and with reference to FIG. 8, the glue roll 42 rotates clockwise so that the outer surface of the roll is moving in the same direction that the paper on the corrugator roll 35 is moving. The metering roll 43 is adjacent to but spaced apart a small distance from the glue roll 42. The metering roll 43 is spaced apart a distance less than 0.005 inches from the gluing roll, and preferably about 0.002 to 0.003 inches. The adhesive formulation accumulates above the gap between the glue roll and metering roll. Consequently, a thin layer of adhesive passes through the gap between the glue roll 42 and metering roll 43, and the glue travels on the surface of the glue roll 42 around to the opposite side where it is picked up by the tips of the flutes of the corrugated medium layer. The medium layer 30, now having been corrugated and now having glue applied to the tips of the flutes, continues to travel on the first corrugator roll 35 to the point where it is bonded to the single face liner 26.

The single face liner 26 is bonded to the corrugated medium 30 through use of a belt module 46. With reference to FIG. 8, the belt module 46 is comprised of a first roller 47, second roller 48, and third roller 49, which are located above the first corrugator roll 35, and also includes a continuous belt 50 wrapped around those three rollers. The belt 50 is preferably made from a metal mesh which can be easily cleaned by merely brushing it with a wire brush, although other belt materials may be suitable as well. The single face liner 26 is brought in contact with the surface of the tips of the corrugated medium 30 in the space between the first corrugator roll 35 and the continuous belt 50. In a conventional corrugation operation, instead of the belt module discussed above, the single face liner would normally be brought in contact with the corrugated medium through the use of only a single roll, which in effect produces a nip point between that roll and one of the flute tips on the first corrugator roll. In comparison, the belt module 46 disclosed herein applies pressure to the outer surface of the single face liner 30 over an area covering several flute tips on the first corrugator roll 35. Preferably, the belt presses the single face liner against at least three and as many as eight flute tips on the first corrugator roll.

The air blower unit 51 is located approximately above the glue unit 41. The air blower unit 51 applies an air pressure above atmospheric pressure against the surface of the corrugated medium 30 while it is traveling from the nip point between the first and second corrugator rolls to the "nip" point between the belt on the belt module and the upper surface of the first corrugator roll.

Upon bonding the single face liner to the corrugated medium, the material travels upwards to an accumulator 52 and bridge 53 where it then travels onward through the process to the double facer bonding station and heating station (discussed further below). The accumulator 52 is comprised of upper and lower belt drives, one each on each side of the corrugated single face material. As with the belt module discussed above, the two belt drives in the accumulator 52 apply less force but over a wider area of the material in comparison of a pair of nip rollers. The belt drives therefore reduce tearing and damage to the material.

The gluing station 21 applies adhesive to the flute tips of the corrugated medium in preparation for applying the double face liner. Of course, the glue is applied at this point on the flute tips on the other side of the medium 30, i.e., the side opposite of the single face liner 26. The gluing station 21 for the double face liner is similarly comprised of a glue roll 55, metering roll 56, and a pooling area 57 for the adhesive. The metering roll 56 is spaced apart from the gluing roll 55 a distance less than about 0.007 inches, and preferably about 0.004 to 0.005 inches. A thin film of glue passes through the gap between the glue roll 55 and metering roll 56, thereby attaching itself to the surface of the glue roll where it rotates around the glue roll and is then applied to the surface of the flute tips.

To apply the glue, the corrugated medium 30 and single face liner 26, which have been previously bonded together, are passed through narrow space between a pressure bar 58 and the glue roll 55. The pressure bar 58 applies a slight pressure to the flat outer surface of the single face liner 26 to press the exposed flute tips on the opposite side of the corrugated medium 30 against the glue roll 55. Instead of the pressure bar shown in FIG. 13, a pressure roller performing substantially the same function may be used. The rotation of the glue roll 55 is controlled so that the outer diameter of the glue roll travels at a speed that is slightly less than the linear speed of the paper. The glue roll preferably rotates at about 98 to 99.5% of paper speed, and preferably about 99% of paper speed. Thus, the glue roll 55 drags a little in comparison to the paper, which causes the flute tips 59 to swipe across the surface of the glue roll and thereby transfer the appropriate amount of glue from the glue roll to the flute tip 59.

Figure 14:
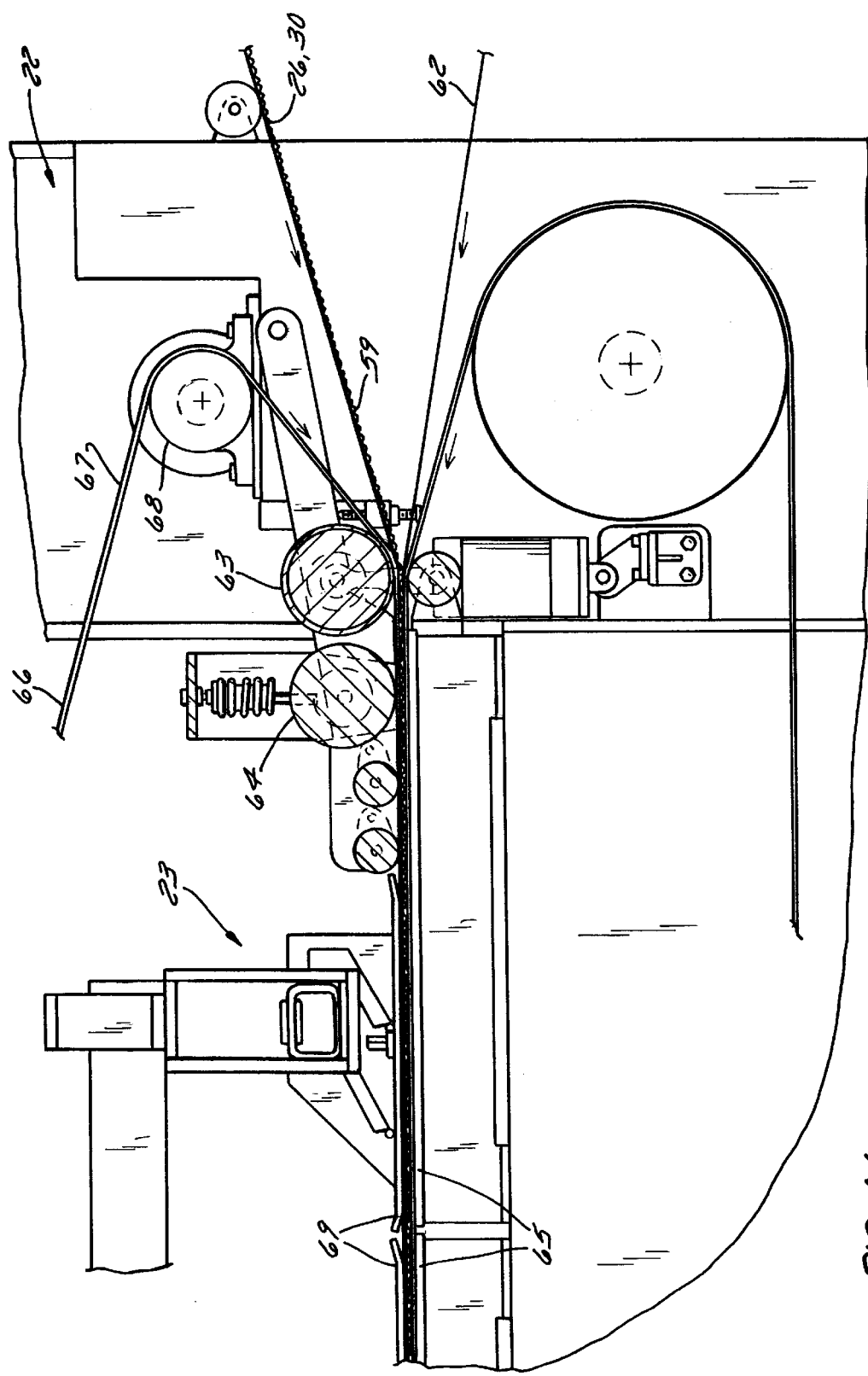
FIG. 14 is a side plan view of the double facer bonding station and a portion of the heating and drying station.
Figure 15:
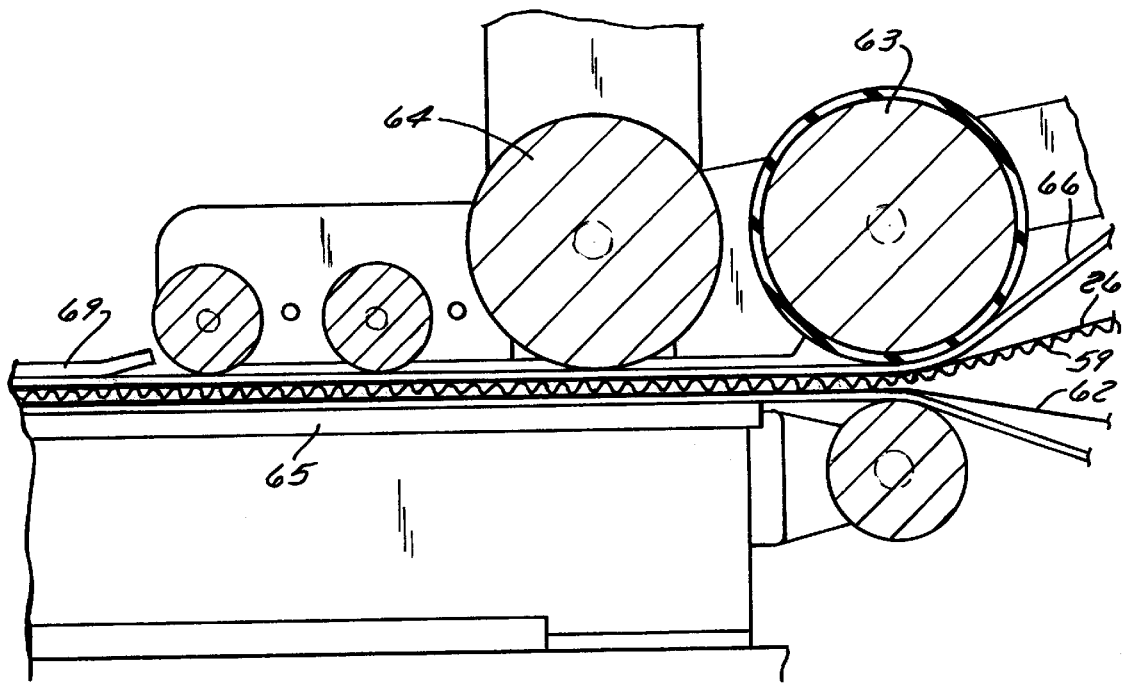
FIG. 15 is a cross section view of the double facer bonding station.

The double facer bonding station 22 includes a third paper unwinder 60 for unwinding a third roll 61 of paper stock for use as the second liner 63, which is sometimes referred to as the double face liner, and bringing it into contact with the glued flute tips 59 of the corrugated medium 30. Referring to FIGS. 14 and 15, the mechanism for bringing the single face corrugated material in contact with the double face liner includes a pair of rollers 63 and 64 which precisely define the contact point for bringing the two layers of material together. Specifically, the mechanism includes a first roll 63 and a second roll 64 located immediately prior to the introduction of the product into the heating and drying unit.

Immediately upon bringing the double face liner into contact with the glued flute tips of the corrugated medium, the product is then introduced into the heating station 23. The heating station consists of a series of steam heated plates 65 and a belt drive 66. The plates 65 are heated by circulating pressurized steam through a series of pipes located directly underneath the plates. The belt drive 66 lies directly above the plates. The corrugated paperboard travels between the belt drive 66 and the surface of the hot plates 65. The belt drive is comprised of a continuous belt 67 wrapped around a plurality of rollers 68, and a series of shoes 69 which apply pressure to the inside surface of the belt, which in turn applies pressure against the exterior surface of the corrugated paperboard.

With reference to FIGS. 1 and 4, the heating station 23 is comprised of twenty-two separate heating plates 65, which are divided into three segments of seven plates, seven plates and eight plates, respectively. The temperatures of the three segments are controlled in order to optimize the evaporation of the moisture in the adhesive to thereby dry the adhesive and solidify the bonds between the layers of paper stock. The separate segments of heat plates are in this case heated to temperatures which increase progressively in order to gradually raise the temperature of the corrugated paperboard. For the manufacturer of the extremely thin corrugated paperboard disclosed herein, the first segment of heat plates is heated within a range of about 110° to 130° and preferably to about 120° F.; the second segment is heated within a range of about 190° to 210° and preferably to about 200° F.; and the third segment is heated within a range of about 260° to 280° and preferably to about 270° F. The goal is to gradually heat the paperboard to a final board temperature of about 255° F. The heating process reduces the moisture content in the corrugated paperboard to a target range of about 5% to 6%. As mentioned above, the first liner and the corrugated medium are quite porous, which permits moisture, especially moisture in the glue, to migrate through the layers of paper and thus evaporate out of the product. The temperature of the product is gradually increased to facilitate the evaporation.

At the end of the process the corrugated paperboard is then scored and cut as desired.

With reference to FIGS. 2 and 3, the resulting product is a very thin, high flute density, printable, corrugated paperboard 70 comprised of a first flat paper liner 71 having an approximate caliper thickness A of about 0.0085 to about 0.010 inches (about 0.21 to about 0.25 mm); a corrugated medium 72 having a paper thickness B about 0.005 to about 0.008 inches (about 0.07 to about 0.10 mm), with the flutes of the corrugated medium having a cordal flute height C of about 0.021 inches (about 0.55 mm) and a distance D between flute crests of about 0.070 inches (about 1.80 mm); and a second flat paper liner 73 having an approximate caliper thickness E of about 0.0065 to about 0.01 inches (about 0.16 to about 0.25 mm); the composite paperboard product having a flute density of about 500 to 600 flutes per linear meter (about 12 to 16 flutes per inch), and preferably about 555 flutes per meter (about 181 flutes per foot) and the composite product having a combined caliper thickness F of about 0.036 to about 0.042 inches (about 0.9 to about 1.1 mm), and preferably about 0.040 inches (about 1.0 mm) or less.

Finally, the present invention has been described and illustrated with reference to particular preferred embodiments of the various elements of the manufacturing process, which naturally includes many details about the materials used in the process, the equipment requirements, and operating parameters. Of course, specific details of the preferred embodiment as described herein are not to be interpreted as limiting the scope of the invention, but are provided merely as a basis for the claims and for teaching one skilled in the art to variously practice the present invention in any appropriate manner. Changes may be made in the details of certain component elements of the corrugated paperboard disclosed herein, or in the equipment used or in the process steps for manufacturing the product, without the departing from the spirit of the invention especially as defined in the following claims.

What is claimed is:

1. A corrugated paperboard comprising:
   a first flat paper liner, said first flat paper liner having a caliper thickness of about 0.0085 to about 0.010 inches;
   a second flat paper liner, said second flat paper liner having a caliper thickness of about 0.0065 to about 0.010 inches; and,
   a corrugated middle layer sandwiched between said first and second flat paper liners, said corrugated middle layer being comprised of a paper stock having a caliper thickness of about 0.005 to 0.008 inches and said corrugated middle layer having about 175 to 185 flutes per linear foot;
   said corrugated paperboard having a combined caliper thickness of about 0.036 to 0.042 inches.

2. The corrugated paperboard of claim 1, wherein the flutes of the corrugated middle layer have a cordal flute height of about 0.021 inches.

3. The corrugated paperboard of claim 2, wherein the distance between any two adjacent flutes is about 0.070 inches.

4. The corrugated paperboard of claim 3, wherein the corrugated middle layer has about 181 flutes per linear foot.

5. The corrugated paperboard of claim 4, said corrugated paperboard having a combined caliper thickness of about 0.040 inches or less.

6. The corrugated paperboard of claim 1, wherein the first flat paper liner is comprised of a paper stock having a porosity, based on the lactic acid drop test, of about 450 seconds or less.

7. The corrugated paperboard of claim 6, wherein the corrugated middle layer is comprised of a paper stock having a porosity, based on the lactic acid drop test, of about 450 seconds or less.

8. The corrugated paperboard of claim 7, wherein the second flat paper liner is comprised of a printable clay-coated paper stock.

9. A method of manufacturing a corrugated paperboard, said corrugated paperboard having an approximate caliper thickness of about 0.040 inches or less, said method comprising the following steps:
   selecting a first roll of paper stock for use as a first liner, said first roll of paper stock having a caliper thickness of about 0.0085 to 0.010 inches and having a porosity, based on a lactic acid drop test, of less than about 450 seconds;
   selecting a second roll of paper stock for use as a corrugated medium, said second roll of paper stock having a caliper thickness of about 0.005 to 0.008 inches and having a porosity, based on the lactic acid drop test, of less than about 450 seconds;

selecting a third roll of paper stock for use as a second liner, said third roll of paper stock having a caliper thickness of about 0.0065 to 0.010 inches and having a printable surface;

mixing an adhesive, said adhesive having a solid content of about 28 to 30 percent, and a Steinhall viscosity of about 20 to 25 seconds;

corrugating said second roll of paper stock by forming in it a regular pattern of flutes, said flutes having a cordal flute height not exceeding about 0.021 inches and the distance between any two adjacent flutes not exceeding about 0.070 inches;

applying a thin film of adhesive about 0.002 to 0.003 inches thick onto a first set of flute crests on one said of the corrugated medium;

bonding the first liner to said one side of said corrugated medium by bringing said first liner into contact with said first set of flute crests and by applying pressure onto said first liner over an area covering a plurality of flute crests;

applying a thin film of adhesive about 0.004 to about 0.005 inches thick onto a second set of flute crests on the other side of the corrugated medium;

bringing said second liner into contact with said second set of flute crests on the other side of the corrugated medium, thereby forming said corrugated paperboard; and progressively heating said corrugated paperboard to evaporate moisture in the adhesive out through the porous first liner and corrugated medium.

10. The method of manufacturing a corrugated paperboard of claim 9, further comprising spreading the second roll of paper stock to remove wrinkles therein prior to corrugating it.

11. The method of manufacturing a corrugated paperboard of claim 9, wherein the steps of applying an adhesive onto the flute crests comprises passing the flute crests across a glue roll, said glue roll having a thin film of glue thereon, and said glue roll having an outer surface rotating at a speed that is slightly less than the speed of that the flute crests are moving.

12. The method of manufacturing a corrugated paperboard of claim 11, wherein the outer surface of the glue roll rotates at about 99 percent of the speed of the flute crests.

13. The method of manufacturing a corrugated paperboard of claim 9, wherein the step of bonding the first liner to the corrugated medium comprises passing the first liner and the corrugated medium between a connector roll and a continuous belt, said continuous belt wrapping over a plurality of flute crests.

14. The method of manufacturing a corrugated paperboard of claim 13, wherein the belt wraps over a minimum of three flute crests.

15. The method of manufacturing a corrugated paperboard of claim 9, wherein the step of progressively heating the corrugated paperboard comprises passing it over a plurality of heated plates.

16. The method of manufacturing a corrugated paperboard of claim 15, wherein the plurality of heated plates are divided into a first segment, second segment and third segment, the second segment being hotter than the first segment, and the third segment being hotter than the second segment.

* * * * *